# 2,940,972
TRI- AND TETRA-SUBSTITUTED PTERIDINE DERIVATIVES

Josef Roch, Biberach, Riss, Germany, assignor to Dr. Karl Thomae G.m.b.H., Biberach a.d. Riss, Germany, a corporation of Germany No Drawing. Filed June 25, 1958, Ser. No. 744,353

Claims priority, application Germany June 27, 1957

9 Claims. (Cl. 260—247.5)

The present invention relates to triamino- and tetra-amino-substituted pteridine derivatives having the general structural formula

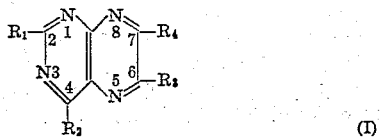

In Formula I above, one of the substituents $R_1$ to $R_4$ is a nitrogen-containing saturated heterocyclic radical linked to a carbon atom of the pteridine nucleus through a heterocyclic nitrogen atom, such as a morpholyl, piperidyl, pyrrolidyl or the like radical; two of the other substituents $R_1$ to $R_4$ are unsubstituted or substituted amino radicals or nitrogen-containing saturated heterocyclic radicals linked to a carbon atom of the pteridine nucleus through a heterocyclic nitrogen atom, such as morpholyl, piperidyl, pyrrolidyl or the like radicals; and the fourth of substituents $R_1$ to $R_4$ is hydrogen, halogen, a substituted or unsubstituted alkyl, aralkyl or aryl radical, an unsubstituted or substituted hydroxyl, thiol or amino radical, or another nitrogen-containing saturated heterocyclic radical linked to a carbon atom of the pteridine nucleus through a heterocyclic nitrogen atom.

The compounds of Formula I above may readily be produced by reacting halogenated pteridines having the general structural formula

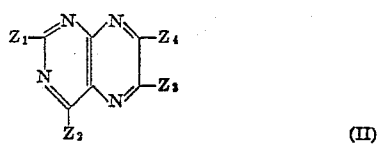

with compounds having the general structural formula $$H—R \qquad (III)$$

in the presence of an acid-neutralizing compound, and in the presence or absence of solvents and reaction accelerators, at temperatures between —20 and +250° C., if desired under pressure. In Formula II above one of the substituents $Z_1$ to $Z_4$ is halogen; two of the other substituents $Z_1$ to $Z_4$ are unsubstituted or substituted amino radicals, nitrogen-containing saturated heterocyclic radicals linked to a carbon atom of the pteridine nucleus through a heterocyclic nitrogen atom, such as morpholyl, piperidyl, pyrrolidyl or the like radicals, or halogen; and the fourth of substituents $Z_1$ to $Z_4$ is hydrogen, halogen, a substituted or unsubstituted alkyl, aryl or aralkyl radical, an unsubstituted or substituted hydroxyl, thiol or amino radical, or another nitrogen-containing saturated heterocyclic radical linked to a carbon atom of the pteridine nucleus through a heterocyclic nitrogen atom.

In Formula III above, R is a nitrogen-containing saturated heterocyclic radical linked to the hydrogen through a heterocyclic nitrogen atom, such as a morpholyl, piperidyl, pyrrolidyl or the like radical, or, if the halogenated pteridine used as the other reaction component has at least one of said nitrogen-containing saturated heterocyclic radicals attached to the nucleus, an unsubstituted or substituted amino radical. If the halogenated pteridine reaction component carries as a substituent one of said nitrogen-containing saturated heterocyclic radicals and, in addition, has two unsubstituted or substituted amino radicals attached to the nucleus, which may also be one of said nitrogen-containing saturated heterocyclic radicals, the substituent R in Formula III above is a substituted hydroxyl or thiol group. If R is a nitrogen-containing saturated heterocyclic radical, such as a morpholyl, piperidyl, pyrrolidyl or the like radical, and if the halogenated pteridine used as the other reactant has at least three halogen atoms and no amino radicals attached to the nucleus, at least three of the halogen atoms present in the pteridine compound are exchanged for the nitrogen-containing saturated heterocyclic radical.

Examples of halogenated pteridines which may be used as one of the reactants in the process for the production of the substituted pteridine derivatives according to the present invention are the following, among others: 2,4,6,7-tetrachloro-pteridine, 2,4,6,7-tetrabromo-pteridine, 2,4,7-trichloro-6-phenyl-pteridine, 2,4,7-trichloro-6-carboxymethyl - pteridine, 2 - benzyl - 4,6,7 - trichloro-pteridine, 2-methylamino-4,6,7-trichloro-pteridine, 2,4-dichloro-6,7-bis-(diethylamino)-pteridine, 2-ethylthio-4-chloro-6,7-dimorpholino-pteridine and 2-phenoxy-4-chloro-6,7-dimorpholino-pteridine.

Examples of compounds having the formula H—R (III above) which may be used for the reaction with the halogenated pteridines are the following: substituted or unsubstituted alcohols, phenols, primary or secondary amines, nitrogen-containing saturated heterocyclic compounds, dialkylaminoalkyl-amines, amino-alcohols and substituted or unsubstituted mercaptans and thiophenols.

It is advantageous to carry out the reaction in the presence of an acid-neutralizing agent, such as an alkali metal hydroxide, alkali metal carbonate, alkali metal alcoholate or tertiary amine. If the compound having the formula H—R (III above) is capable of acting as an alkaline, acid-neutralizing agent, the reaction may also be carried out in the presence of an excess of such a compound.

As already mentioned, the reaction may be carried out in the presence of or without solvents or diluents. Preferably, however, the reaction is carried out in the presence of solvents which do not take part in the reaction, such as acetone, dioxan, benzene or dimethylformamide. If it is found by a simple preliminary experiment that the boiling point of any particular inert solvent does not lie within the temperature range which is most favorable for the performance of the reaction, it may be carried out under pressure. Also water and alcohol may be used as solvents and diluents, particularly if the reaction is carried out in the absence of an inorganic alkaline, acid-neutralizing compound and at low temperatures, because they practically do not react with the halogenated pteridines under those reaction conditions. Furthermore, if the compound having the formula H—R (III above) is liquid under the reaction conditions, an excess thereof may be used as the solvent or diluent for the reaction.

Copper and copper salts as well as alkali metal iodides have been found to be particularly suitable as reaction accelerators for the above-described process.

If the halogenated pteridine used as one of the reactants carries at least two halogen substituents, the exchange of these two or more halogen atoms for the radical R of compound H—R may be carried out stepwise. Thus, in the reaction of 2,4,6,7-tetrachloro-pteridine, for example, with amines at low temperature, preferably in the presence of a solvent and accompanied by cooling, only the two halogen atoms in the 6- and 7-positions are exchanged for the amino groups. If the reaction mixture is heated to medium high temperatures (around 100° C.), not only the two halogen atoms in the 6- and 7-positions are replaced by an amino group but also a third halogen atom, very probably the one in the 2-position. Upon heating 2,4,6,7-tetrachloro-pteridine with amines to higher temperatures—that is, above about 170° C.—possibly under pressure and in the presence of a reaction accelerator, all of the halogen atoms attached to the pteridine nucleus are exchanged for amino groups.

The halogen atoms of the halogenated pteridine reactants, even those in the 2-position and above all in the 4-position, which are difficult to exchange, can be very easily replaced by the nitrogen-containing saturated heterocyclic radical, as I have surprisingly found.

The pteridine derivatives according to the invention having structural formula I above, as well as their readily water-soluble salts, exhibit unexpected and surprising pharmacological activities, such as coronary dilating, sedative, antipyretic and analgesic activities. For example, 2-(β-hydroxyethylamino) - 4 - chloro-6,7 - dipiperidino-pteridine, and particularly 4-ethoxy-2,6,7-trimorpholino-pteridine, exhibit a very good coronary dilating effect, coupled with a very small blood pressure-variation effect. 2,4-dimorpholino-6,7-bis-(dimethylamino)-pteridine not only has a very good coronary dilating effect but also exhibits excellent sedative and antipyretic activities. Finally, 2,4-dimorpholino-6,7-dipiperidino - pteridine exhibits not only sedative activity but also a very good analgesic activity.

The following examples will further illustrate the present invention and enable others skilled in the art to understand the invention more completely. However, it will be understood that the invention is not limited to the specific compounds produced in accordance with the particular examples below.

EXAMPLE 1

*2-morpholino-4-chloro-6,7-dipiperidino-pteridine*

7.4 gm. (0.02 mol) 2,4-dichloro-6,7-dipiperidino-pteridine (obtained from 2,4,6,7-tetrachloro-pteridine and piperidine in dioxan, accompanied by cooling; M.P.=186–187° C.) were heated for about 1 hour under reflux with 5 cc. morpholine in 120 cc. dioxan, whereby morpholine-hydrochloride separated out. After adding about 250 cc. water to the reaction mixture thus obtained, the pteridine derivative formed by the reaction separated out in the form of a yellow, initially greasy precipitate, while the morpholine-hydrochloride dissolved. After allowing the reaction product to stand for a short period of time, it solidified and it was then separated by vacuum filtration, washed with water and dried at 110° C. The yield was 8.1 gm., which corresponds to 97% of the theoretical yield. For the purpose of analysis, the compound was reprecipitated once from highly dilute hydrochloric acid and recrystallized once from ethanol. The purified product was obtained in the form of fine, light-yellow needles having a M.P. of 158–159° C.

$C_{20}H_{28}ON_7Cl$ (molecular weight 417.9): Calculated: C, 57.47%; H, 6.75%; N, 23.46%. Found: C, 56.44%; H, 6.30%; N, 23.41%.

EXAMPLE 2

*2-methylamino-4-chloro-6,7-dimorpholino-pteridine*

7.4 gm. (0.02 mol) 2,4-dichloro-6,7-dimorpholino-pteridine (obtained from 2,4,6,7-tetrachloro-pteridine and morpholine in dioxan, accompanied by cooling; M.P.= 208–209° C.) were heated with 25 cc. of a solution of methyl amine in absolute alcohol (about 25%) at 100° C. for 1 hour in a closed tube. Upon pouring the brown solution obtained thereby into 300 cc. water, 2-methylamino-4-chloro-6,7-dimorpholino - pteridine precipitated out in the form of a yellow, amorphous precipitate. After vacuum filtration, washing and drying, 5.0 gm. of the reaction product, corresponding to 68% of the theoretical yield, were obtained. After reprecipitating the raw product once from cold 0.1 N hydrochloric acid and recrystallizing the same twice from methanol, the pure reaction product was obtained in the form of small, light-yellow needles, having a M.P. of 224–226° C.

EXAMPLE 3

*2,4-dimorpholino-6,7-bis-(dimethylamino)-pteridine*

5.7 gm. (0.02 mol) 2,4-dichloro-6,7-bis-(dimethylamino)-pteridine (obtained from 2,4,6,7-tetrachloro-pteridine and a solution of dimethylamine in absolute alcohol, accompanied by cooling; M.P.=247–248° C.) were heated with 17.2 gm. (0.2 mol) morpholine for 2 hours at about 200° C. in a closed tube. The reaction mixture was rinsed out of the tube with water, the aqueous mixture was filtered on a vacuum filter, and the filter cake was washed and dried. The yield was 7.7 gm. which corresponds to 99% of the theoretical yield. For purification of the raw product, the compound was reprecipitated twice from very highly dilute hydrochloric acid and recrystallized once from methanol. The purified product was obtained in the form of yellow, microcrystalline, flat prisms, having a M.P. of 191–192° C.

$C_{18}H_{28}O_2N_8$ (molecular weight 388.5): Calculated: C, 55.66%; H, 7.26%. Found: C, 55.61%; H, 7.21%.

EXAMPLE 4

*2,4-bis-(dimethylamino)-6,7-dimorpholino-pteridine*

7.4 gm. (0.02 mol) 2,4-dichloro-6,7-dimorpholino-pteridine were heated with 20 cc. of a 45% solution of dimethyl amine in absolute alcohol and 0.1 gm. copper sulfate for 2 hours at about 200° C. in a closed tube. Thereafter, the reaction mixture obtained thereby was taken up in 200–300 cc. water, whereby the raw tetraamino-pteridine derivative precipitated out in the form of a greasy yellow precipitate, which solidified soon thereafter. The precipitate was separated by vacuum filtration, washed with water and dried at 110° C. The yield was 6.8 gm., which corresponds to 87% of the theoretical yield. For analysis, the raw product was recrystallized once from a methanol-water mixture (1:1) and once from absolute methanol. The pure product was obtained in the form of a bright-yellow, microcrystalline powder, having a M.P. of 164–165° C.

$C_{18}H_{28}O_2N_8$ (molecular weight 388.5): Calculated: C, 55.66%; H, 7.26%. Found: C, 55.71%; H, 7.35%.

EXAMPLE 5

*4-chloro-2,6,7-tripiperidino-pteridine*

A solution of 10.8 gm. (0.04 mol) 2,4,6,7-tetrachloro-pteridine in 150 cc. dioxan was admixed with 25.5 gm. (0.3 mol) piperidine, and the resulting mixture was refluxed for about 1 hour. Piperidine-hydrochloride separated out in the form of a yellow, crystalline precipitate. Thereafter, about 500 cc. water were added to the reaction mixture, whereupon the reaction product separated out in the form of a brown, greasy precipitate, which solidified after standing for several hours, whereas the piperidine-hydrochloride dissolved. After separating the precipitate by vacuum filtration and washing and drying it, 16.0 gm. of the raw reaction product were obtained, which corresponds to 96% of the theoretical yield. For purification, the raw compound was reprecipitated once from 0.1 N hydrochloric acid and was once recrystallized from methanol. The purified reaction product was obtained in the form of small, yellowish-brown prisms, having a M.P. of 147–148° C.

EXAMPLE 6

*2,4,6,7-tetramorpholino-pteridine*

4.5 gm. (0.01 mol) 2,4,6,7-tetrabromo-pteridine were heated with 25 cc. morpholine for about 2 hours at 200–220° C. in a closed tube. Thereafter, the contents of the tube were taken up in dilute hydrochloric acid, whereby a clear solution was obtained from which the reaction product did not precipitate, even after adding ammonia. The reaction product did not separate out until after part of the solution was evaporated. In order to remove inorganic salts, the raw product was digested with warm, dry benzene. The undissolved portion was separated by vacuum filtration and the solution was evaporated to dryness in a vacuum. The yield was 4.0 gm., which corresponds to 85% of the theoretical yield. For analysis, the tetramorpholino-pteridine was reprecipitated twice from approximately 0.1 N hydrochloric acid. The purified product was obtained in the form of a bright-yellow, microcrystalline powder (prisms) having a M.P. of 187–188° C.

$C_{22}H_{32}O_4N_8$ (molecular weight 472.5): Calculated: N, 23.72%. Found: N, 23.34%.

EXAMPLE 7

*2-morpholino-4-dimethylamino-6,7-dipiperidino-pteridine*

8.3 gm. (0.02 mol) 2-morpholino-4-chloro-6,7-dipiperidino-pteridine were heated with 10 cc. of a 45% solution of dimethyl amine in absolute alcohol for 2 hours at about 200° C. in a closed pressure tube. The resulting reaction mixture was taken up in 200–300 cc. water, whereupon the raw tetraamino-pteridine derivative separated out in the form of a yellow, initially greasy precipitate. The precipitate was allowed to stand for a short period of time and was then separated by vacuum filtration, washed with water and dried. The yield was 8.0 gm., which corresponds to 94% of the theoretical yield. The raw 2-morpholino-4-dimethylamino-6,7-dipiperidino-pteridine was first purified by transforming it into the hydrochloride addition salt. For this purpose, the raw product was dissolved in hot, dilute hydrochloric acid and the resulting solution was admixed with animal charcoal and filtered. Upon cooling the solution, the hydrochloride addition salt separated out in the form of yellow needles, which were separated by vacuum filtration, again dissolved in hot water and reprecipitated from the aqueous solution with concentrated ammonia. Thereafter, the compound was recrystallized once from a mixture of dioxan and water. The bright greenish-yellow microcrystalline prisms thus obtained had a M.P. of 104–105° C. after having been dried at room temperature in a vacuum. For analysis, the purified product was subsequently dried at 70° C. and under a pressure of 0.1 kg./cm.$^2$ until its weight remained constant, whereupon it had a M.P. of 141–142° C.

$C_{22}H_{34}ON_8$ (molecular weight 426.6): Calculated: C, 61.95%; H, 8.03%. Found: C, 61.74%; H, 8.25%.

EXAMPLE 8

*4-diethanolamino-2,6,7-trimorpholino-pteridine*

4.2 gm. (0.01 mol) 4-chloro-2,6,7-trimorpholino-pteridine were heated with 20 cc. diethanolamine for about 30 minutes at 200° C., and the reaction solution thus obtained was cooled and taken up in 150 cc. water. After standing for several days, the tetraamino-pteridine reaction product separated out in the form of a yellow, amorphous precipitate. The precipitate was separated by vacuum filtration, washed with water and dried at 110° C. The yield was 1.0 gm., which corresponds to 20% of the theoretical yield. For analysis, the raw product was recrystallized twice from water. The pure product was obtained in the form of small, bright-yellow needles having a M.P. of 224–225° C.

$C_{22}H_{34}O_5N_8$ (molecular weight 490.6): Calculated: C, 53.86%; H, 6.99%. Found: C, 53.45%; H, 6.38%.

EXAMPLE 9

*2-(β-hydroxyethylamino)-4-morpholino-6,7-dipiperidino-pteridine*

7.8 gm (0.2 mol) 2-(β-hydroxyethylamino)-4-chloro-6,7-dipiperidino-pteridine were heated with 15 cc. morpholine and 1 cc. of a cold-saturated, aqueous copper sulfate solution for 2 hours at 200° C. in a closed tube. The contents of the tube (a brownish-yellow amorphous substance) were washed out of the tube with 150 cc. water and were separated by vacuum filtration, washed and immediately reprecipitated from 1/10 N hydrochloric acid. After drying the reprecipitated product in a vacuum at room temperature, 6.0 gm. of the reaction product were obtained, which corresponds to 68% of the theoretical yield. For analysis, the tetraamino-pteridine reaction product was recrystallized once from a dioxan-water mixture (1:1) and twice from dioxan. The purified reaction product was obtained in the form of intertwined, microscopically small yellow crystals, which had a M.P. of 168–170° C. after prolonged drying at 110° C.

$C_{22}H_{34}O_2N_8$ (molecular weight 442.6): Calculated: C, 59.71%; H, 7.74%. Found: C, 59.60%; H, 7.85%.

EXAMPLE 10

*2-methylamino-4-chloro-6,7-dipiperidino-pteridine*

10 cc. piperidine were added dropwise and slowly to a solution of 5.6 gm. (0.02 mol) 2-methylamino-4,6,7-trichloro-pteridine in 150 cc. dioxan, accompanied by cooling and stirring, whereby piperidine-hydrochloride precipitated out. The reaction mixture was then poured into 500 cc. water, whereby 2-methylamino-4-chloro-6,7-dipiperidino-pteridine separated out in the form of a brown, amorphous precipitate, while the piperidine-hydrochloride dissolved. The precipitate was separated by vacuum filtration, washed with water and dried at 110° C. The yield was 2.0 gm., which corresponds to 27% of the theoretical yield. For analysis, the raw reaction product was reprecipitated once from cold 0.1 N hydrochloric acid and recrystallized twice from methanol. The purified reaction product was obtained in the form of a yellow, micro-crystalline powder having a M.P. of 240–242° C.

$C_{17}H_{24}N_7Cl$ (molecular weight 361.9): Calculated: C, 56.42%; H, 6.69%. Found: C, 56.65%; H, 6.68%.

EXAMPLE 11

*2-methylamino-4,6,7-trimorpholino-pteridine*

5.6 gm. (0.02 mol) 2-methylamino-4,6,7-trichloro-pteridine were heated with 20 cc. morpholine for 2 hours at 200° C. in a closed pressure tube. The brown, crystalline reaction product formed thereby was rinsed out of the tube with about 300 cc. water, separated by vacuum filtration, washed and dried. The yield of raw reaction product was 6.5 gm., which corresponds to 76% of the theoretical yield. For purification, the raw reaction product was reprecipitated once from cold 0.1 N hydrochloric acid and recrystallized twice from methanol. The purified product was obtained in the form of bright-yellow, microcrystalline, tetragonal prisms having a M.P. of 254–256° C.

EXAMPLE 12

*2,4,7-trimorpholino-6-phenyl-pteridine*

3.1 gm. (0.01 mol) 2,4,7-trichloro-6-phenyl-pteridine (obtained from 2,4,7-trihydroxy-6-phenyl-pteridine with phosphorus - pentachloride and phosphorus - oxychloride under reflux; M.P.=157–158° C.) were heated with 20 cc. morpholine and 0.5 gm. sodium iodide for 2 hours at 200° C. in a closed tube. The reaction mixture was rinsed out of the tube with approximately 250 cc. water and the yellow precipitate was separated by vacuum filtration, washed and dried. The yield was 4.5 gm., which corresponds to 97% of the theoretical yield. For purification, the raw reaction product was reprecipitated once from cold 0.1 N hydrochloric acid and recrystallized twice from methanol. The purified product was obtained in the form of a bright-yellow, microcrystalline powder (prisms) having a M.P. of 201–202° C.

EXAMPLE 13

4-ethoxy-2,6,7-trimorpholino-pteridine 8.4 gm. (0.02 mol) 4 - chloro - 2,6,7 - trimorpholino-pteridine were refluxed with a solution of 0.5 gm. (about 0.02 mol) sodium in 300 cc. absolute alcohol for 2 hours. Thereafter, the small amount of undissolved material was separated by vacuum filtration. The filtrate was allowed to cool, whereupon the reaction product separated out in the form of crystalline needles. To complete the precipitation, the solution was admixed with three times its volume of water. The precipitate was separated by vacuum filtration, washed and dried. The yield was 7.3 gm., which corresponds to 85% of the theoretical yield. For analysis, the raw product was recrystallized twice from methanol. The pure product was obtained in the form of colorless, microcrystalline needles having a M.P. of 198–200° C.

$C_{20}H_{29}O_4N_7$ (molecular weight 431.5): Calculated: C, 55.67%; H, 6.77%. Found: C, 55.63%; H, 6.72%.

EXAMPLE 14

4-(β-ethoxy-ethoxy)-2,6,7-trimorpholino-pteridine 8.4 gm. (0.02 mol) 4-chloro-2,6,7-trimorpholino-pteridine were added to a solution of 0.5 gm. (0.022 mol) sodium in 40 cc. ethylglycol and 60 cc. dioxan, and the mixture was then heated for 30 minutes at about 100° C. Thereafter, the hot reaction solution was filtered and 200 cc. water were added to the filtrate, whereupon the reaction product separated out in the form of orange needles. The yield was 7.6 gm., which corresponds to 80% of the theoretical yield. For purification, the raw product was recrystallized once from methanol, then reprecipitated once from dilute hydrochloric acid, and finally recrystallized once from benzene. The purified product was obtained in the form of very fine, felted, ivory needles. After drying at 110° C., the pure product was faintly yellow and had a M.P. of 149–150° C. Recrystallized from methanol and dried at 110° C., the purified product had a M.P. of 153–154° C.

$C_{22}H_{33}O_5N_7$ (molecular weight 475.6): Calculated: C, 55.57%; H, 6.99%. Found: C, 55.40%; H, 7.13%.

EXAMPLE 15

4-phenoxy-2,6,7-trimorpholino-pteridine 4.2 gm. (0.01 mol) 4-chloro-2,6,7-trimorpholino-pteridine were added to a melt consisting of 10 gm. phenol and 1 gm. sodium hydroxide, the melt having been heated to about 60° C. The resulting mixture was then heated for 10 minutes at 180–200° C. The reaction mixture was then taken up in about 200 cc. dilute ammonia, whereupon 4-phenoxy-2,6,7-trimorpholino-pteridine separated out in the form of a yellow precipitate. The mixture was allowed to stand for some time and then the precipitate was separated by vacuum filtration, washed and dried. The raw reaction product was recrystallized from methanol and was thereby recovered in the form of weakly yellow, very small needles having a M.P. of 239–240° C. The yield of pure substance was 1.2 gm., which corresponds to 25% of the theoretical yield.

$C_{24}H_{29}O_4N_7$ (molecular weight 479.5): Calculated: C, 60.11%; H, 6.09%. Found: C, 59.50%; H, 6.09%.

EXAMPLE 16

4-ethylthio-2,6,7-trimorpholino-pteridine 5 cc. ethyl mercaptan, dissolved in 20 cc. 4 N sodium hydroxide, were added dropwise to a solution of 6.0 gm. (about 0.014 mol) 4-chloro-2,6,7-trimorpholino-pteridine in 200 cc. boiling dimethylformamide. The resulting mixture was then refluxed for about 30 minutes. A small amount of undissolved material was filtered off and the filtrate was admixed with water. The aqueous solution was then evaporated in a vacuum until it had a volume of about 50 cc. The reaction product, which separated out during the evaporation step, was filtered off by vacuum filtration, washed and dried. The yield was 4.0 gm., which corresponds to 64% of the theoretical yield. For analysis, the raw product was recrystallized twice from methanol. The purified product was obtained in the form of small, bright-yellow prisms which contained crystallization methanol. After drying for 4 hours at 110° C., the purified product had a M.P. of 193–195° C.

$C_{20}H_{33}O_3N_7S$ (molecular weight 451.6): Calculated: C, 53.19%; H, 7.37%. Found: C, 53.10%; H, 6.52%.

EXAMPLE 17

4-phenylthio-2,6,7-trimorpholino-pteridine 4.2 gm. (0.01 mol) 4-chloro-2,6,7-trimorpholino-pteridine were refluxed for 1½ hours with 5 cc. thiophenol and 2 cc. pyridine in 50 cc. dimethyl formamide. Thereafter, the solvent was evaporated in a vacuum. The raw oily reaction product which remained behind was digested with dilute ammonia and thereafter separated by vacuum filtration. After recrystallizing the filter cake once from methanol, the reaction product was obtained with a yield of 3.5 gm., which corresponds to 71% of the theoretical yield. For analysis, the reaction product was again recrystallized from methanol and was obtained in the form of a bright-yellow, microcrystalline powder having a M.P. of 186–187° C.

$C_{24}H_{29}O_3N_7S$ (molecular weight 495.6): Calculated: C, 58.16%; H, 5.90%. Found: C, 58.60%; H, 5.72%.

EXAMPLE 18

2-phenyl-4,6,7-trimorpholino-pteridine 3.1 gm. (0.01 mol) raw 2-phenyl-4,6,7-trichloro-pteridine (obtained by heating 2-phenyl-4,6,7,-trihydroxy-pteridine with phosphorus-pentachloride and phosphorus-oxychloride under pressure; M.P.=187–189° C.) were refluxed with 60 cc. morpholine (boiling point 128° C.) for 2 hours. While the reaction mixture was still warm it was poured into about 300 cc. water, whereupon 2-phenyl-4,6,7-trimorpholino-pteridine separated out in the form of a yellow precipitate. The raw reaction product was reprecipitated once from 2 N sulfuric acid. The yield was 4.4 gm., which corresponds to 95% of the theoretical yield. For further purification, the reaction product was recrystallized once from methanol, whereby a yellow, microcrystalline powder, having a M.P. of 209–210° C., was obtained.

$C_{24}H_{29}O_3N_7$ (molecular weight 463.5): Calculated: C, 62.18%; H, 6.31%. Found: C, 62.05%; H, 6.34%.

EXAMPLE 19

2-ethylthio-4-pyrrolidino-6,7-dimorpholino-pteridine 4.0 gm. (0.01 mol) 2-ethylthio-4-chloro-6,7,-dimorpholino-pteridine were heated at about 200° C. with 20 cc. pyrrolidine for 2 hours in a closed tube. The reaction product was rinsed out of the tube with water, dissolved in dilute hydrochloric acid, and immediately precipitated by adding concentrated ammonia to the acid solution. The raw 2-ethylthio-4-pyrrolidino-6,7-dimorpholino-pteridine separated out in the form of a stringy, highly viscous mass which solidified after being allowed to stand for some time. For purification, the reaction product was reprecipitated three times from approximately 0.1 N hydrochloric acid. The yield was 1.7 gm., which corresponds to 39% of the theoretical yield. After recrystallization from a mixture of methanol and water (1:1), the purified product was obtained in the form of bright-yellow, irregular crystals having a M.P. of 118–120° C.

EXAMPLE 20

2(4)-hydroxy-4(2)-6,7-trimorpholino-pteridine 1.5 gm. (0.0045 mol) 2(4)-hydroxy-4(2)-chloro-6,7- dimorpholino-pteridine were heated with 15 cc. morpholine for 2 hours at about 200° C. in a closed tube. The reaction product was rinsed out of the tube with water. The alkaline solution formed thereby was neutralized with 2 N sulfuric acid, whereupon the reaction product precipitated out in the form of a brownish precipitate. The precipitate was separated by vacuum filtration, washed and dried. The yield was 1.0 gm., which corresponds to 59% of the theoretical yield. For analysis, the raw reaction product was reprecipitated once from 2 N hydrochloric acid, yielding a dirty yellow powder having a M.P. of 242–243° C.

$C_{18}H_{25}O_4N_7$ (molecular weight 403.5): Calculated: C, 53.59%; H, 6.25%. Found: C, 53.58%; H, 6.13%.

EXAMPLE 21

*2,4-dimorpholino-7-dimethylamino-pteridine*

2.4 gm. (0.01 mol) 2,4-dichloro-7-dimethylamino-pteridine (obtained from 2,4,7-trichloro-pteridine and a solution of dimethyl amine in absolute alcohol in the presence of dioxan, accompanied by cooling; M.P.=172–175° C.) were heated with 15 cc. morpholine for 2 hours at 200° C. in a closed tube. The jelly-like, brown reaction mixture was taken up in about 300 cc. water, whereupon the raw 2,4-dimorpholino-7-dimethylamino-pteridine separated out in the form of an ivory, amorphous precipitate. The precipitate was separated by vacuum filtration, washed with water and dried at 110° C. The yield was 2.4 gm., which corresponds to 70% of the theoretical yield. For purification, the raw product was reprecipitated from 0.1 N hydrochloric acid and recrystallized twice from methanol. The purified product was obtained in the form of ivory, microcrystalline leaflets having a M.P. of 194–195° C.

$C_{16}H_{23}O_2N_7$ (molecular weight 345.4): Calculated: C, 55.63%; H, 6.71%. Found: C, 55.65%; H, 7.10%.

EXAMPLE 22

*2,7-dimorpholino-4-pyrrolidino-6 carboxymethyl-pteridine*

2.0 gm. (0.05 mol) 2,7-dimorpholino-4-chloro-6-carboxymethyl-pteridine (obtained from 2,4,7-trichloro-6-carboxymethyl-pteridine by boiling with morpholine under reflux in the presence of dioxan; M.P. about 150° C.) were heated with 15 cc. pyrrolidine for 2 hours at about 200° C. in a closed tube. The reaction mixture was then rinsed out of the tube with about 200 cc. water, forming a dark-brown solution which was neutralized with hydrochloric acid and partially evaporated. The raw pteridine derivative separated out in the form of a brown, flocculent precipitate. The precipitate was separated by vacuum filtration, washed and dried in a vacuum at room temperature. The yield was 1.2 gm., which corresponds to 56% of the theoretical yield. For purification, the raw product was reprecipitated three times from 0.1 N hydrochloric acid by neutralization with 2 N ammonia. The purified product was obtained in the form of an olive powder having a M.P. of 115–117° C. (sintering).

The following table illustrates some additional tri- and tetra-substituted pteridine derivatives having the general structural Formula I above, and indicates the method illustrated in one of the above examples which may be employed to produce the particular pteridine derivative.

TABLE

| Pteridine Derivative No. | $R_1$ | $R_2$ | $R_3$ | $R_4$ | Produced by Process as in Example No.— | Yield in percent of Theory | Melting Point, °C. | Remarks |
|---|---|---|---|---|---|---|---|---|
| 1 | −N(CH₃)(C₂H₄OH) | −Cl | −N◯O | −N◯O | 1 | 70 | 203–204 | |
| 2 | −N◯O | −Cl | −NH−CH₂−C₆H₅ | −NH−CH₂−C₆H₅ | 1 | 87 | 201–202 | |
| 3 | −N◯O | −Cl | −N(C₂H₅)₂ | −N(C₂H₅)₂ | 1 | 56 | 115–116 | |
| 4 | −NH−C₂H₄OH | −Cl | −N◯ | −N◯ | 1 | 95 | 175–177 | |
| 5 | −N◯ | −Cl | −N◯O | −N◯O | 1 | 89 | 219–220 | |
| 6 | −N(CH₃)₂ | −Cl | −N◯O | −N◯O | 2 | 92 | 164–166 | |
| 7 | −N◯O | −Cl | −N◯O | −N◯O | 5 | 72 | 245–246 | |
| 8 | −N◯O | −N◯O | −NH−C₆H₅ | −NH−C₆H₅ | 3 | 86 | about 231 | 1 hr. 220° C.+ CuSO₄. |
| 9 | −N◯O | −N◯O | −NH−C₂H₄OH | −NH−C₂H₄OH | 3 | 65 | 231–232 | |
| 10 | −N◯O | −N◯O | −N◯ | −N◯ | 3 | 97 | 183–184 | +CuSO₄. |
| 11 | −N◯O | −N◯O | −NH₂ | −NH₂ | 3 | 49 | 294–295 | +KI. |
| 12 | −N◯O | −N◯O | −NH−CH₃ | −NH−CH₃ | 3 | 86 | 233–235 | |

TABLE—Continued

Legend for ring structures:
- [morph] = morpholino (hexagon with -N- and -O-)
- [pip] = piperidino (hexagon with -N-)
- [pip-NPh] = 4-phenylpiperazino (hexagon with -N- and -N-C₆H₅)

| Pteridine Derivative No. | R₁ | R₂ | R₃ | R₄ | Produced by Process as in Example No.— | Yield in percent of Theory | Melting Point, °C. | Remarks |
|---|---|---|---|---|---|---|---|---|
| 13 | -N[morph] | -N[morph] | -N(CH₃)(C₂H₄OH) | -N(CH₃)(C₂H₄OH) | 3 | 46 | 188–189 | |
| 14 | -N[morph] | -N(CH₃)₂ | -N[morph] | -N[morph] | 7 | 93 | 227–229 | +CuSO₄. |
| 15 | -N[morph] | -N(CH₃)(C₂H₄OH) | -N[morph] | -N[morph] | 9 | 64 | 273–274 | |
| 16 | -N(CH₃)(C₂H₄OH) | -N[morph] | -N[morph] | -N[morph] | 9 | 87 | 134–136 | without CuSO₄. |
| 17 | -N[pip] | -N(CH₃)₂ | -N[morph] | -N[morph] | 7 | 90 | 181–182 | |
| 18 | -N[pip] | -N[pip] | -N[morph] | -N[morph] | 9 | 85 | 163–175 | Do. |
| 19 | -N[pip] | -N[morph] | -N[morph] | -N[morph] | 9 | 88 | 180–181 | Do. |
| 20 | -N(CH₃)₂ | -N[morph] | -N[morph] | -N[morph] | 9 | 87 | 190–191 | Do. |
| 21 | -NH-CH₃ | -Cl | -N[morph] | -N[morph] | 10 | 67 | 222–224 | |
| 22 | -N[morph] | -N[morph] | -N[morph] | -H | 12 | 65 | 276–277 | |
| 23 | -CH₂-C₆H₅ | -N[morph] | -N[morph] | -N[morph] | 18 | 43 | about 195 | raw product. |
| 24 | -N[pip-NPh] | -Cl | -N[morph] | -N[morph] | 1 | 37 | 99–101 | |
| 25 | -N[pip-NPh] | -N[morph] | -N[morph] | -N[morph] | 9 | 40 | 106–109 | |
| 26 | -N[pip-NPh] | -N[pip-NPh] | -N[morph] | -N[morph] | 3 | 51 | 96–99 | +dioxan as solvent. |
| 27 | -N[morph] | -S-CH₂COOH | -N[morph] | -N[morph] | 16 | 25 | 265–267 | |
| 28 | -N[morph] | -N[morph] | -CH₃ | -N[morph] | 21 | 80 | 197–198 | |
| 29 | -N(CH₂)₅ | -Cl | -N(CH₃)₂ | -N(CH₃)₂ | 3 (1) | 92 | 135–137 | +triethylamine. |
| 30 | -N(CH₂)₅ | -N[morph] | -N(CH₃)₂ | -N(CH₃)₂ | 9 | 63 | 163–164 | 5 hrs. at 200° C. |
| 31 | -N[morph] | -O-C₂H₄-N(C₂H₅)₂ | -N[morph] | -N[morph] | 14 | 60 | 133–135 | |
| 32 | -NH-C₂H₄-N[morph] | -Cl | -N[morph] | -N[morph] | 1 | 88 | 249–251 | |
| 33 | -N[morph] | -N[morph] | -N(CH₃)₂ | -H | 21 | 52 | 162–164 | |
| 34 | -N[morph] | -N[morph] | -H | -N[morph] | 12 | 80 | 279–281 | |
| 35 | -N(CH₃)(C₂H₄OH) | -Br | -N[morph] | -N[morph] | 1 | 53 | 185–187 | |
| 36 | -C₆H₅ | -N[morph] | -N(CH₃)₂ | -N(CH₃)₂ | 9 | 63 | 254–255 | without CuSO₄. |

TABLE—Continued

| Pteridine Derivative No. | R₁ | R₂ | R₃ | R₄ | Produced by Process as in Example No.— | Yield in percent of Theory | Melting Point, °C. | Remarks |
|---|---|---|---|---|---|---|---|---|
| 37 | —N͡O (morpholino) | —N͡O | —C₆H₅ | —N͡O | 18 | 73 | 202–203 | |
| 38 | —N͡O | —N͡ (piperidino) | —N(CH₃)₂ | —N(CH₃)₂ | 9 | 92 | 151–152 | |
| 39 | —N͡ (piperidino) | —N͡O | —N(CH₃)₂ | —N(CH₃)₂ | 9 | 87 | 164–166 | |
| 40 | —SH | —N͡O | —N͡O | —N͡O | 12 | 21 | 300–302 | |
| 41 | —NH–CH₂–CH=CH₂ | Cl | —N͡O | —N͡O | 1 | 76 | 194–195 | at 100° C. under pressure. |

While the present invention has been illustrated with the aid of certain specific examples, it will be obvious to those skilled in the art that the invention is not limited to these particular examples and that various changes and modifications may be made without departing from the spirit of the invention or the scope of the appended claims.

I claim:

1. Pteridines having the structural formula

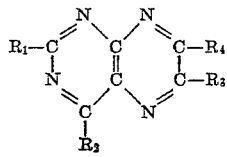

wherein one of the substituents $R_1$, $R_2$, $R_3$ and $R_4$ is selected from the group consisting of morpholyl, piperidyl, pyrrolidyl, hexamethyleneimino and N'-phenyl-piperazyl, two of the other substituents $R_1$ through $R_4$ are selected from the group consisting of amino, alkyl-amino, dialkyl-amino, aryl-amino, aralkyl-amino, hydroxyalkyl-amino, hydroxyalkyl-alkyl-amino, morpholyl, piperidyl, pyrrolidyl, hexamethyleneimino and N'-phenyl-piperazyl, and the fourth of substituents $R_1$ through $R_4$ is selected from the group consisting of hydrogen, halogen, lower alkyl, benzyl, phenyl, hydroxy, lower alkoxy, phenoxy, thiol, lower alkyl-thio, phenyl-thio, amino, alkyl-amino, dialkyl-amino, aryl-amino, aralkyl-amino, hydroxyalkyl-amino, hydroxy-alkyl-alkyl-amino, morpholyl, piperidyl, pyrrolidyl, hexamethyleneimino and N'-phenyl-piperazyl.

2. 2,4,6,7-tetramorpholino-pteridine.
3. 4-dimethylamino-2,6,7-trimorpholino-pteridine.
4. 2,4-dimorpholino-6,7-bis-(dimethylamino)-pteridine.
5. 4-ethoxy-2,6,7-trimorpholino-pteridine.
6. 2,4-bis-(dimethylamino)-6,7-dimorpholino-pteridine.
7. 2-morpholino - 4 - dimethylamino-6,7 - dipiperidino-pteridine.
8. 2,4-dimorpholino-6,7-di-(methylamino)-pteridine.
9. 4-ethoxyethoxy-2,6,7-trimorpholino-pteridine.

References Cited in the file of this patent

UNITED STATES PATENTS 2,667,486    Cain                Jan. 26, 1954